United States Patent
Li et al.

(10) Patent No.: US 11,247,587 B2
(45) Date of Patent: Feb. 15, 2022

(54) VEHICLE SEAT AND ANGLE ADJUSTMENT DEVICE THEREOF

(71) Applicant: HUBEI AVIATION PRECISION MACHINERY TECHNOLOGY CO., LTD., Hubei (CN)

(72) Inventors: Shuangqiang Li, Xiangyang (CN); Zili Lei, Xiangyang (CN); Xianhu Luo, Xiangyang (CN); Feng Yin, Xiangyang (CN); Wei Deng, Xiangyang (CN)

(73) Assignee: HUBEI AVIATION PRECISION MACHINERY TECHNOLOGY CO., LTD., Xiangyang (CN)

(*) Notice: Subject to any disclaimer, the term of this patent is extended or adjusted under 35 U.S.C. 154(b) by 0 days.

(21) Appl. No.: 17/254,133

(22) PCT Filed: Aug. 3, 2018

(86) PCT No.: PCT/CN2018/098499
§ 371 (c)(1),
(2) Date: Dec. 18, 2020

(87) PCT Pub. No.: WO2020/015024
PCT Pub. Date: Jan. 23, 2020

(65) Prior Publication Data
US 2021/0268940 A1    Sep. 2, 2021

(30) Foreign Application Priority Data

Jul. 20, 2018  (CN) .......................... 201810806392.9
Jul. 20, 2018  (CN) .......................... 201821164386.X (51) Int. Cl.
*B60N 2/235*     (2006.01)
*B60N 2/22*      (2006.01)

(52) U.S. Cl.
CPC ......... *B60N 2/2362* (2015.04); *B60N 2/2227* (2013.01)

(58) Field of Classification Search
CPC ..... B60N 2/236; B60N 2/2362; B60N 2/2227
See application file for complete search history.

(56) References Cited

U.S. PATENT DOCUMENTS

2013/0264858 A1*  10/2013  Ootaki ...................... B60N 2/02
                                                      297/463.1
2016/0075261 A1*  3/2016   Gallienne .............. B60N 2/236
                                                      16/354

(Continued)

FOREIGN PATENT DOCUMENTS

CN    105416112 A    3/2016
CN    205416112 A    3/2016

(Continued)

OTHER PUBLICATIONS

PCT International Search Report and Written Opinion, PCT/CN2018/098499, dated Dec. 6, 2018, 12 pgs.

Primary Examiner — Milton Nelson, Jr.
(74) Attorney, Agent, or Firm — Fenwick & West LLP (57) ABSTRACT

A vehicle seat and an angle adjustment device are provided. The angle adjustment device includes an unlock cam, a ratchet wheel provided with internal teeth, and a plurality of slide blocks disposed circumferentially and provided with external teeth. The angle adjustment device further includes a plurality of extension and retraction blocks corresponding to the slide blocks, wherein the extension and retraction block is capable of driving the slide block to move outwards in a radial direction so as to engage the internal teeth with the external teeth. A second elastic member is provided between two adjacent extension and retraction blocks, and two ends of the second elastic member in a deformation (Continued)

direction are respectively connected to the unlock cam and the extension and retraction block.

15 Claims, 6 Drawing Sheets

(56) References Cited

U.S. PATENT DOCUMENTS

2017/0057383 A1   3/2017  Assis et al.
2017/0361736 A1  12/2017  Chang

FOREIGN PATENT DOCUMENTS

| CN | 106314219 A | 1/2017 |
| CN | 106627269 A | 5/2017 |
| CN | 107406014 A | 11/2017 |

* cited by examiner

Fig. 4 unlocking direction

VEHICLE SEAT AND ANGLE ADJUSTMENT DEVICE THEREOF

The present application is a 35 U.S.C. 371 Patent Application of PCT Application No. PCT/CN2018/098499, filed on Aug. 3, 2018, which claims the priority to Chinese Patent Application No. 201810806392.9, titled "VEHICLE SEAT AND ANGLE ADJUSTMENT DEVICE THEREOF", and the priority to Chinese Patent Application No. 201821164386.X, titled "VEHICLE SEAT AND ANGLE ADJUSTMENT DEVICE THEREOF", filed with the China National Intellectual Property Administration on Jul. 20, 2018, both of which are incorporated herein by reference in their entireties.

FIELD

The present application relates to the technical field of mechanical design, and in particular to a vehicle seat and an angle adjustment device thereof.

BACKGROUND

When a vehicle seat is in use, it is necessary to adjust the angle of a seat back relative to a seat for meeting the requirements of different users, so as to improve the seating comfort of the seat.

At present, an existing vehicle angle adjustment device includes a ratchet wheel fixedly connected with the seat back and provided with internal teeth, and a sliding groove plate fixed with the seat and provided with a sliding groove. Multiple sliding blocks with external teeth are arranged on the sliding groove plate, and each sliding block is controlled to extend in the radial direction through an expansion and contraction mechanism, so as to realize the engagement of the internal teeth of the ratchet wheel and the external teeth of the sliding block. Meanwhile, a return spring is arranged between the sliding blocks, and both ends of each return spring in the axial direction respectively abut against a flange on the sliding groove plate and the expansion and contraction mechanism, so as to realize the synchronous expansion and contraction of each sliding block in the radial direction.

In the above angle adjustment process, when the seat is locked, the radially extending locking torque of the sliding block is provided by the return spring. Correspondingly, when the seat is unlocked, the external unlocking torque also needs to overcome the locking torque to achieve unlocking. Generally, in order to ensure the locking reliability, the locking torque of the return spring is usually set to a relatively large value, which causes an unlocking torque to be also relatively large when the unlocking is performed, thus making the people uncomfortable.

In view of this, how to provide an angle adjustment device that can improve the comfort of unlocking while ensuring high locking reliability is a technical problem to be solved by those skilled in the art.

SUMMARY

To solve the above technical problem, an object of the present application is to provide an angle adjustment device, including an unlocking cam, a ratchet wheel provided with internal teeth and multiple sliding blocks distributed along the circumferential direction and provided with external teeth. The angle adjustment device further includes multiple expansion and contraction blocks corresponding to the multiple sliding blocks, and the multiple expansion and contraction blocks can drive the multiple sliding blocks to move outwards in radial directions, so as to allow the internal teeth to be meshed with the external teeth; a second elastic piece is arranged between adjacent expansion and contraction blocks, and two ends of the second elastic piece along the deformation direction are respectively connected with the unlocking cam and the multiple expansion and contraction blocks.

The expansion and contraction blocks are used for driving the multiple sliding block to extend out in radial directions, so as to realize the engagement of the multiple sliding block and the ratchet wheel. When the unlocking cam rotates in the unlocking direction, the multiple sliding blocks can be separated from the ratchet wheel. When the angle adjustment device is unlocked, an unlocking torque needs to be provided from the outside to drive the unlocking cam to rotate in the unlocking direction, and only when the unlocking torque reaches a certain value, can the unlocking cam be driven to overcome the locking force to rotate in the unlocking direction.

In the present application, when the unlocking cam rotates in the unlocking direction, the second elastic piece which is in a compressed state and connected with the unlocking cam and the multiple expansion and contraction blocks can act on the unlocking cam and the multiple expansion and contraction blocks. Moreover, the elastic force of the second elastic piece on the unlocking cam faces the unlocking direction, and the elastic force on the multiple expansion and contraction blocks faces the locking direction. Therefore, the elastic force of the second elastic piece on the unlocking cam in the unlocking direction can reduce the unlocking torque that needs to be provided by the outside world to act on the unlocking cam when the angle adjustment device is unlocked. Thus, the angle adjustment device can realize the unlocking process with only a small unlocking torque, and the comfort when the angle adjustment device is unlocked is improved.

Meanwhile, in the locking process, after the unlocking torque disappears, the second elastic piece can provide enough elastic force to drive the expansion and contraction block to rotate, thus ensuring the reliability of the locking process. When a relatively large number of sliding blocks are provided, it still has high unlocking comfort and locking reliability.

Preferably, the angle adjustment device further includes a first elastic piece and a sliding groove plate that rotates relative to the ratchet wheel. One end of the first elastic piece is connected to the sliding groove plate, and the other end of the first elastic piece is directly or indirectly connected to the unlocking cam so as to allow the torque of the unlocking cam to be transmitted.

Preferably, the angle adjustment device further includes a central shaft, the unlocking cam has a central hole, the central shaft is matched with the central hole, and the central shaft can drive the unlocking cam to rotate in the unlocking direction when the central shaft rotates in the unlocking direction;

The first elastic piece is connected to the central shaft so as to be indirectly connected to the unlocking cam.

Preferably, the unlocking cam has multiple first protrusions, matching grooves are provided on the expansion and contraction blocks, and two ends of the second elastic piece along the deformation direction are respectively abutted against the corresponding first protrusions and the matching grooves.

Preferably, multiple mounting holes are provided on the unlocking cam, an upside down edge is provided on a side wall of each of the multiple mounting holes, and the upside down edge is the first protrusion.

Preferably, the expansion and contraction block has a second protrusion, the unlocking cam is provided with a groove, and two ends of the second elastic piece in the deformation direction respectively abut against the second protrusion and a side wall of the groove.

Preferably, the first elastic piece is a flat spiral spring, and an outer end of the flat spiral spring is fixed to the sliding groove plate, and an inner end of the flat spiral spring is fixed to the central shaft so as to allow the torque of the central shaft to be transmitted.

Preferably, the sliding groove plate is provided with a fixing column, an outer end of the first elastic piece is hooked with the fixing column, and when the central shaft drives the inner end of the first elastic piece to rotate in the unlocking direction, the fixing column can restrict the outer end of the first elastic piece from moving.

Preferably, a flange is provided on a middle part of the sliding groove plate, and the expansion and contraction block can move along an outer peripheral surface of the flange.

The flange is integrally formed with the sliding groove plate, or the flange is fixedly connected with the sliding groove plate.

Meanwhile, the present application further provides a vehicle seat, including a seat and a seat back, and further includes an angle adjustment device for adjusting the angle of the seat back relative to the seat. The angle adjustment device is the angle adjustment device described above.

In FIGS. 1 to 6:

| 1 | sheath | 2 | ratchet wheel |
|---|---|---|---|
| 3 | unlocking cam | 31 | sliding block control groove |
| 32 | central hole | 33 | mounting hole |
| 34 | first protrusion | 4 | sliding block |
| 41 | sliding block boss | 42 | external teeth |
| 51 | first elastic piece | 52 | second elastic piece |
| 6 | expansion and contraction block | 61 | matching groove |
| 7 | central shaft | 71 | flat step |
| 72 | matching section | 8 | sliding groove plate |
| 81 | sliding groove | 82 | sector boss |
| 83 | fixing column | 84 | flange |

DETAILED DESCRIPTION

In order to provide those skilled in the art a better understanding of the solutions of the present application, the present application is described hereinafter in further detail in conjunction with the drawings and embodiments.

Figure 1:
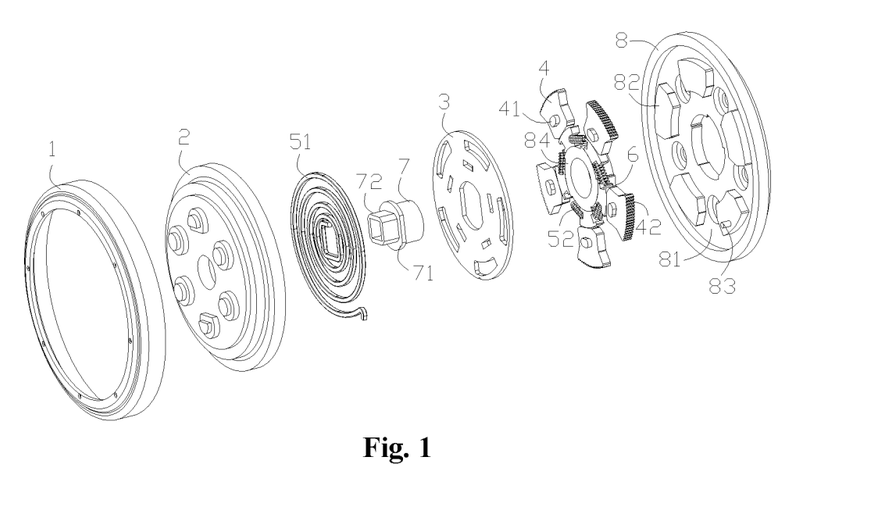
FIG. 1 is an exploded view of an angle adjustment device provided by the present application.
Figure 2:
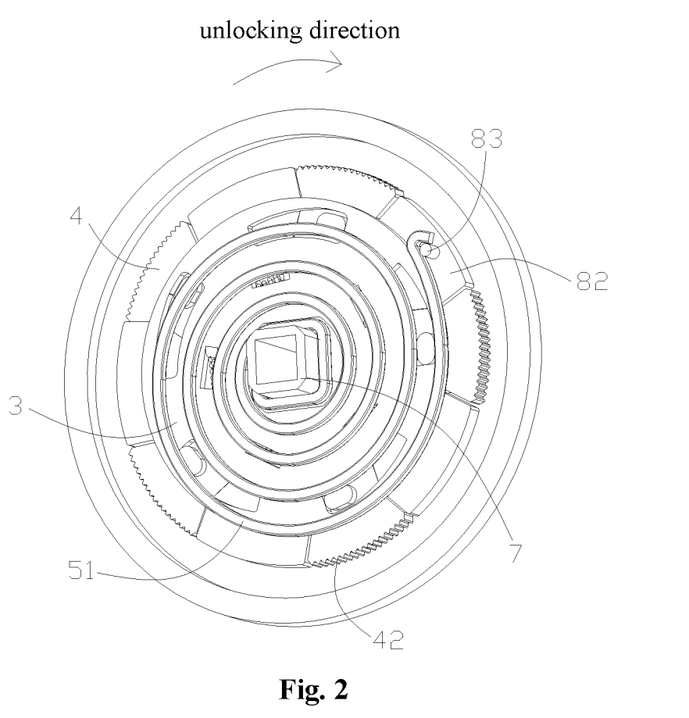
FIG. 2 is a schematic structural diagram of a core component of the angle adjustment device provided by the present application.
Figure 3:
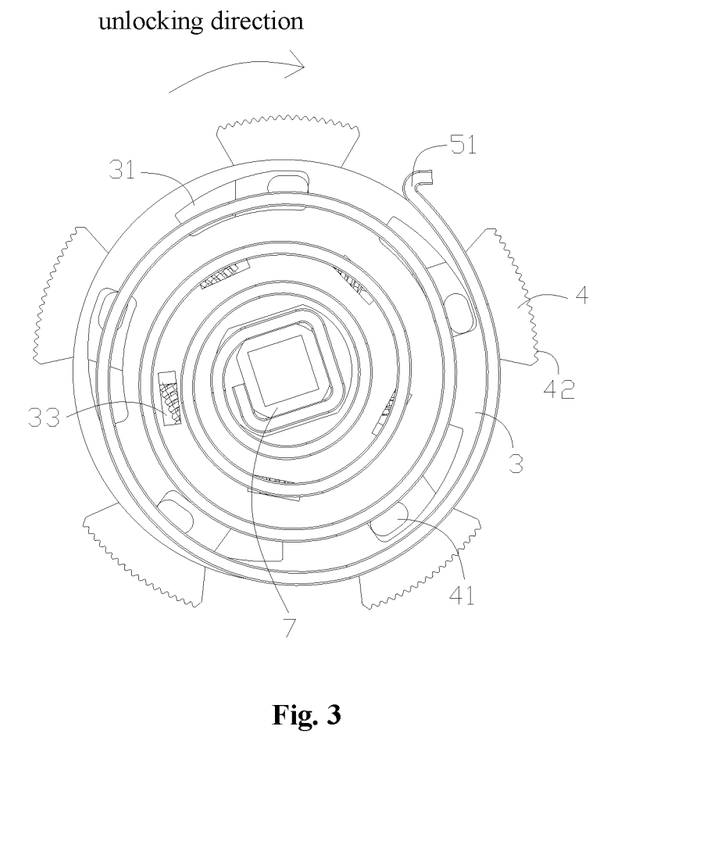
FIG. 3 is a structural schematic diagram of the core component in FIG. 2 with a sliding groove plate removed.
Figure 4:
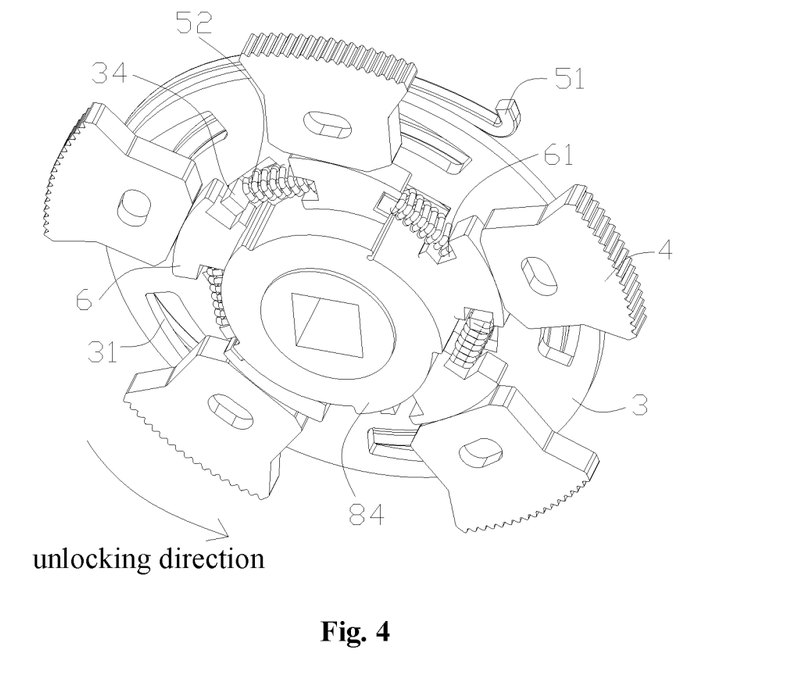
FIG. 4 is a structural schematic diagram of the core component in FIG. 3 from another perspective.
Figure 5:
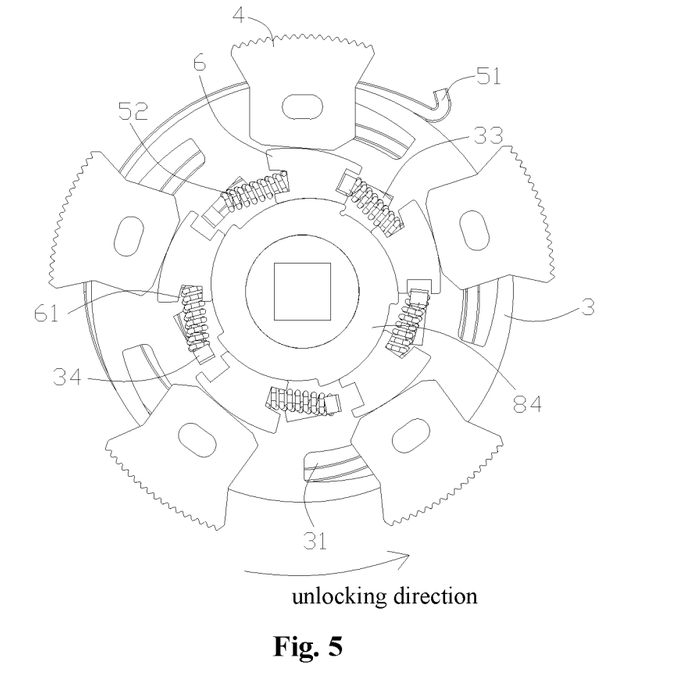
FIG. 5 is a back view of the core component in FIG. 3.
Figure 6:
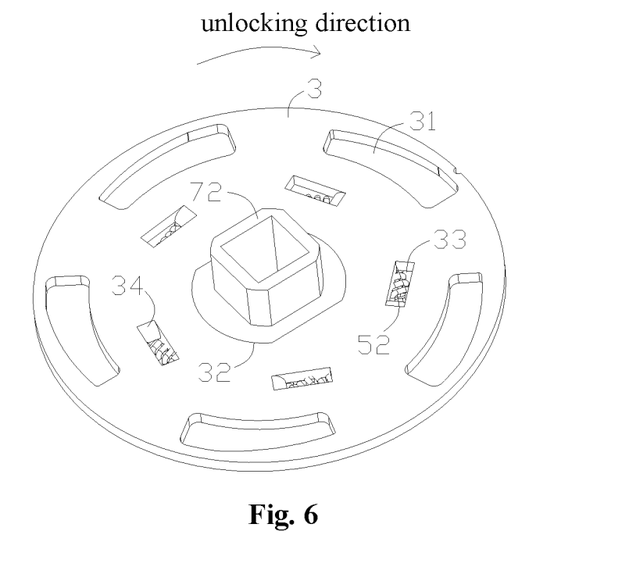
FIG. 6 is a structural schematic diagram of the core component in FIG. 3 without a first elastic piece and a sliding block.

Referring to FIG. 1 to FIG. 6, where, FIG. 1 is an exploded view of the angle adjustment device provided by the present application; FIG. 2 is a schematic structural diagram of a core component of an angle adjustment device provided by the present application; FIG. 3 is a structural schematic diagram of the core component in FIG. 2 with the sliding groove plate removed; FIG. 4 is a structural schematic diagram of the core component in FIG. 3 from another perspective; FIG. 5 is a back view of the core component in FIG. 3; FIG. 6 is a structural schematic diagram of the core component in FIG. 3 without a first elastic piece and a sliding block.

In a specific embodiment, the present application provides an angle adjustment device. As shown in FIG. 1, the angle adjustment device includes a sheath 1, a ratchet wheel 2 and a sliding groove plate 8. The sheath 1 is used for fixing the ratchet wheel 2 and the sliding groove plate 8 with each other in an axial direction, and the ratchet wheel 2 can rotate relative to the sliding groove plate 8. When the angle adjustment device is used in a vehicle seat, the ratchet wheel 2 is fixed to a seat back of a vehicle seat.

The angle adjustment device further includes a core component that can realize angle adjustment. The core component includes an unlocking cam 3 and multiple sliding blocks 4 distributed along the circumference of the sliding groove plate 8 and provided with external teeth 42. The external teeth 42 of the sliding block 4 can mesh with the internal teeth of the ratchet wheel 2, and the external teeth 42 and the internal teeth have at least three meshing relationships, namely, tooth to tooth (non-meshing) state, semi-meshing state and complete meshing state. When the external teeth 42 and the internal teeth are in a tooth to tooth state, the angle adjustment device is in an unlocked state. When the external teeth 42 and the internal teeth are completely meshed, the angle adjustment device is in a locked state. When the external teeth 42 and the internal teeth are in a semi-meshing state, the angle adjustment device is in a process of movement from unlocking to locking.

As for FIGS. 2 to 6, a clockwise direction in FIGS. 2, 3 and 6 is an unlocking direction, and a counterclockwise direction is the locking direction. Since FIGS. 4 and 5 are back views of FIGS. 2, 3 and 6, the counterclockwise direction is a unlocking direction and the clockwise direction is the locking direction.

Meanwhile, in order to achieve the above three states between the external teeth 42 of the sliding block 4 and the internal teeth of the ratchet wheel 2, the sliding block 4 needs to be able to move in the radial direction. Moreover, the external teeth 42 can mesh with the internal teeth of the ratchet wheel 2 when it moves radially outward, and the external teeth 42 can disengage from the internal teeth when it moves radially inward. In order to realize the radial movement of the sliding block 4, an expansion and contraction mechanism is provided on the angle adjustment device.

Specifically, the expansion and contraction mechanism includes multiple expansion and contraction blocks 6, and the multiple expansion and contraction blocks 6 are distributed along the circumferential direction of the sliding groove plate 8, and each expansion and contraction block 6 is located in a same diameter direction of the sliding groove plate 8 as each sliding block 4. An inner ring of the sliding block 4 has a first mating surface, and an outer ring of the expansion and contraction block 6 has a second mating surface, both of which are arc surfaces and have opposite bending directions; or, one of the first mating surface and the second mating surface is a flat surface, and the other of the first mating surface and the second mating surface is an arc surface protruding toward the one. In the embodiment shown in FIG. 5, the second mating surface of the expansion and contraction block 6 is an arc surface protruding outward, and the first mating surface of the sliding block 4 is a flat surface.

A second elastic piece 52 in a compressed state is arranged between two adjacent expansion and contraction blocks 6. The second elastic piece 52 is used for driving the expansion and contraction block 6 to move in the circumferential direction, thereby changing the position where the second mating surface of the expansion and contraction block 6 abuts against the first mating surface of the sliding block 4, so as to drive the sliding block 4 to move outward in the radial direction, thus realizing the engagement between the external teeth 42 of the sliding block 4 and the internal teeth of the ratchet wheel 2.

Meanwhile, the unlocking cam 3 is provided with multiple sliding block control grooves 31, which are arc-shaped grooves. At the same time, the sliding block 4 has multiple sliding block bosses 41, and the sliding block bosses 41 are located in the sliding block control groove 31 and can slide relative to the sliding block control groove 31.

When the angle adjustment device is locked, the expansion and contraction block 6 rotates in the locking direction under the action of the second elastic piece 52. During the rotation, the corresponding sliding block 4 can be driven to extend radially outward until the external teeth 42 are completely engaged with the internal teeth to reach the locking state. At this time, the expansion and contraction block 6 is in the self-locking position. When the angle adjustment device is unlocked, the external torque drives the unlocking cam 3 to rotate in the unlocking direction, the second elastic piece 52 drives the expansion and contraction block 6 to leave the self-locking position, and the sliding block 4 is driven to move radially inward during the rotation of the sliding block control groove 31 until the external teeth 42 are completely separated from the internal teeth, thus reaching the unlocking state.

Specifically, a flange 84 is provided on the middle of the sliding groove plate 8, and the expansion and contraction blocks 6 are evenly distributed on the outer periphery of the flange 84. Driven by the second elastic piece 52, the expansion and contraction blocks 6 can rotate circumferentially along the outer peripheral wall of the flange 84. The flange 84 can be integrally formed with the sliding groove plate 8, or can be fixedly connected with the sliding groove plate 8. In the embodiment shown in FIG. 1, the flange 84 and the sliding groove plate 8 are of separate structures, and they have mutually matched hooks and grooves so as to realize clamping and fixing.

Further, the sliding groove plate 8 has multiple sliding grooves 81 that are matched with the sliding blocks 4, and the sliding blocks 4 can move radially in the corresponding sliding grooves 81. Specifically, the sliding groove plate 8 has multiple sector bosses 82 evenly distributed along the circumferential direction, and each sliding groove 81 is formed between adjacent sector bosses 82.

In the above embodiments, the two ends of each second elastic piece 52 along the deformation direction are respectively connected to the unlocking cam 3 and the expansion and contraction block 6.

As described above, the expansion and contraction block 6 is used for driving the sliding block 4 to extend in the radial direction, so as to realize the engagement of the sliding block 4 and the ratchet wheel 2. When the unlocking cam 3 rotates towards the unlocking direction, the sliding block 4 can be separated from the ratchet wheel 2. When the angle adjustment device is unlocked, an unlocking torque needs to be provided from the outside for driving the unlocking cam 3 to rotate in the unlocking direction, and only when the unlocking torque reaches a certain value, can the unlocking cam 3 be driven to overcome the locking force to rotate in the unlocking direction.

In the present application, when the unlocking cam 3 rotates towards the unlocking direction in FIGS. 2 to 6, the second elastic piece 52 which is in a compressed state and connected with the unlocking cam 3 and the expansion and contraction block 6 can act on the unlocking cam 3 and the expansion and contraction block 6. Moreover, the elastic force of the second elastic piece 52 on the unlocking cam faces the unlocking direction (the counterclockwise direction shown in FIG. 4), and the elastic force on the expansion and contraction block 6 faces the locking direction (the clockwise direction shown in FIG. 4). Therefore, the elastic force of the second elastic piece 6 on the unlocking cam 3 in the unlocking direction can reduce the unlocking torque that needs to be provided by the outside world to act on the unlocking cam 3 when the angle adjustment device is unlocked. Thus the angle adjustment device can realize the unlocking process by only a small unlocking torque, and the comfort is improved when the angle adjustment device is unlocked.

Meanwhile, in the locking process, after the unlocking torque disappears, the second elastic piece 52 can provide enough elastic force to drive the expansion and contraction block 6 to rotate, thus ensuring the reliability of the locking process. The locking torque is determined by the second elastic piece 52, which can be arbitrarily designed. When a relatively larger number of sliding blocks 4 are provided, it still has high unlocking comfort and locking reliability.

Further, as shown in FIGS. 1 to 6, the angle adjustment device further includes a first elastic piece 51. One end of the first elastic piece 51 is connected to the sliding groove plate 8, and the other end of the first elastic piece 51 is directly or indirectly connected to the unlocking cam 3, so that the unlocking torque applied by the outside is transmitted to the unlocking cam 3.

As described above, when the angle adjustment device is unlocked, the unlocking cam 3 is driven to rotate relative to the sliding groove plate 8, and the first elastic piece 51 can transmit the unlocking torque applied by the outside to the unlocking cam 3. Therefore, the unlocking torque required by the unlocking cam 3 is represented by the torque transmitted by the first elastic piece 51. Meanwhile, the elastic force of the second elastic piece 52 on the unlocking cam 3 can reduce the torque transmitted by the first elastic piece 51, thereby reducing the required unlocking torque.

In this embodiment, as the first elastic piece 51 and the second elastic piece 52 are both connected (directly or indirectly connected) with the unlocking cam 3, and the unlocking forces of the first elastic piece 51 and the second elastic piece 52 on the unlocking cam 3 are in opposite directions during the unlocking process, the unlocking force required by the outside can be reduced, thereby improving the comfort when the angle adjustment device is unlocked.

Further, as shown in FIG. 1, the angle adjustment device further includes a central shaft 7. The unlocking cam 3 has a central hole 32, which is a flat hole with an arc section and a straight section. The central shaft 7 has a flat step 71 matched with the central hole 32, and the flat step 71 is closely matched with the central hole 32, so that when an external handle drives the central shaft 7 to rotate, the unlocking cam 3 can be driven to rotate. The unlocking torque acting on the central shaft 7 is the torque provided by the external handle, and the torque received by the unlocking cam 3 (the torque provided by the outside) is the torque of the first elastic piece 51 to the unlocking cam 3 minus the torque of the second elastic piece 52 to the unlocking cam 3.

Specifically, the first elastic piece 51 is connected to the central shaft 7 so as to be indirectly connected to the unlocking cam 3.

In this embodiment, that indirectly connecting the first elastic piece 51 to the unlocking cam 3 through the central shaft 7 has the advantage of saving the mounting space of the core component, and facilitates the arrangement of the first elastic piece 51 without changing the arrangement of the second elastic piece 52.

More specifically, as shown in FIG. 1, the first elastic piece 51 is a flat spiral spring, the flat spiral spring can transmit torque, and an inner end of the flat spiral spring is fixed to the central shaft 7, and can rotate with the central shaft 7, and an outer end of the flat spiral spring is fixed to the sliding groove plate 8. As shown in FIG. 1, the central shaft 7 has a matching section 72, the cross section of the matching section 72 is square, correspondingly, the inner end of the flat spiral spring forms a square hole, the square hole is sleeved on the matching section 72, so as to realize the connection between the flat spiral spring and the central shaft 7.

Meanwhile, the sector boss 82 of the sliding groove plate 8 is provided with a fixing column 83, an outer end of the first elastic piece 51 is hooked with the fixing column 83, and when the central shaft 7 drives an inner end of the first elastic piece 51 to rotate in the unlocking direction, the fixing column 83 can restrict the outer end of the first elastic piece 51 from moving. Therefore, the outer end of the flat spiral spring is secured, and the inner end of the flat spiral spring bears and transmits torque.

Of course, the fixing between the first elastic piece 51 and the sliding groove plate 8 does not necessarily need to be achieved by the fixing column 83, and other fixing methods in the art, such as welding, can also be used.

In the above embodiments, as shown in FIG. 4, the unlocking cam 3 has multiple first protrusions 34 extending towards the expansion and contraction block 6, and the expansion and contraction block 6 is provided with a matching groove 61 along a circumferential side wall portion. The two ends of the second elastic piece 52 along the deformation direction respectively abut against the corresponding first protrusion 34 and the matching groove 61, so as to realize the connection of the second elastic piece 52 with the unlocking cam 3 and the expansion and contraction block 6.

Specifically, as shown in FIG. 5, multiple mounting holes 33 are provided on the unlocking cam 3, and the mounting holes 33 are used for mounting various components of the angle adjustment device, and upside down edges are respectively provided on the side walls of the mounting holes 33, and the upside down edges are namely the first protrusions 34.

Of course, each of the first protrusions 34 may also be a structure welded to the surface of the unlocking cam 3.

In another embodiment, the expansion and contraction block 6 has a second protrusion extending towards the unlocking cam 3, the unlocking cam 3 is provided with a groove, and two ends of the second elastic piece 52 in the deformation direction respectively abut against the second protrusion and the side wall of the groove, so as to realize the connection of the second elastic piece 52 with the unlocking cam 3 and the expansion and contraction block 6.

Therefore, in the present application, as long as the second elastic piece 52 can be connected with the unlocking cam 3 and the expansion and contraction block 6, the connection structure of the three is not limited.

Specifically, in the above embodiments, the expansion and contraction block 6 is a wedge-shaped block.

It should be noted that, the angle adjustment device in the present application can be used for adjusting the seat back of the vehicle seat, or it can also be used for adjusting the relative angle of other structures.

Further, the present application further provides a vehicle seat, including a seat and a seat back, and further including an angle adjustment device for adjusting the angle of the seat back relative to the seat, where, the angle adjustment device is the angle adjustment device described in any of the above embodiments.

Since the angle adjustment device has the above technical effects, the vehicle seat including the angle adjustment device should also have corresponding technical effects, which will not be repeated here.

The vehicle seat and angle adjustment device thereof according to the present application are described in detail hereinbefore. The principle and embodiments of the present application are described through specific examples herein. The description of the above-described embodiments is merely used to facilitate understanding the method and core idea of the present application. It should be noted that, for those skilled in the art, various improvements and modifications may be further made to the present application without departing from the principle of the present application, and these improvements and modifications also fall within the protection scope defined by the claims of the present application.

The invention claimed is:

1. An angle adjustment device, comprising:
 an unlocking cam,
 a ratchet wheel provided with internal teeth,
 a plurality of sliding blocks distributed along a circumferential direction and provided with external teeth,
 a plurality of expansion and contraction blocks corresponding to the plurality of sliding blocks,
 a first elastic piece,
 a second elastic piece, and
 a sliding groove plate that is rotatable relative to the ratchet wheel,
 wherein one end of the first elastic piece is connected to the sliding groove plate, and another end of the first elastic piece is directly or indirectly connected to the unlocking cam so as to allow torque of the unlocking cam to be transmitted,
 wherein the plurality of expansion and contraction blocks is configured to respectively drive the plurality of sliding blocks to move outwards in radial directions so as to allow the internal teeth to be meshed with the external teeth and the second elastic piece is arranged between adjacent expansion and contraction blocks, and two ends of the second elastic piece along a deformation direction are respectively connected with the unlocking cam and the plurality of expansion and contraction blocks.

2. The angle adjustment device according to claim 1, wherein, a flange is provided on a middle part of the sliding groove plate, and the expansion and contraction block is configured to move along an outer peripheral surface of the flange; and the flange is integrally formed with the sliding groove plate, or the flange is fixedly connected with the sliding groove plate.

3. A vehicle seat, comprising a seat and a seat back, and further comprising an angle adjustment device for adjusting the angle of the seat back relative to the seat, wherein, the angle adjustment device is the angle adjustment device according to claim 1.

4. The angle adjustment device according to claim 1, further comprising a central shaft, wherein the unlocking cam has a central hole, the central shaft is matched with the central hole, and the central shaft is configured to drive the unlocking cam to rotate in an unlocking direction when the central shaft rotates in an unlocking direction; and the first elastic piece is connected to the central shaft so as to be indirectly connected to the unlocking cam.

5. The angle adjustment device according to claim 4, wherein, a flange is provided on a middle part of the sliding groove plate, and the expansion and contraction block is configured to move along an outer peripheral surface of the flange; and the flange is integrally formed with the sliding groove plate, or the flange is fixedly connected with the sliding groove plate.

6. A vehicle seat, comprising a seat and a seat back, and further comprising an angle adjustment device for adjusting the angle of the seat back relative to the seat, wherein, the angle adjustment device is the angle adjustment device according to claim 4.

7. The angle adjustment device according to claim 4, wherein, the first elastic piece is a flat spiral spring, and an outer end of the flat spiral spring is fixed to the sliding groove plate (8), and an inner end of the flat spiral spring is fixed to the central shaft so as to allow the torque of the central shaft to be transmitted.

8. The angle adjustment device according to claim 7, wherein, the sliding groove plate is provided with a fixing column, an outer end of the first elastic piece is hooked with the fixing column, and when the central shaft drives an inner end of the first elastic piece to rotate in the unlocking direction, the fixing column is configured to restrict the outer end of the first elastic piece from moving.

9. The angle adjustment device according to claim 1, wherein, the unlocking cam has a plurality of first protrusions, each of the plurality of expansion and contraction blocks is provided with a matching groove, and two ends of the second elastic piece along the deformation direction respectively abut against a corresponding first protrusion and the matching groove.

10. A vehicle seat, comprising a seat and a seat back, and further comprising an angle adjustment device for adjusting the angle of the seat back relative to the seat, wherein, the angle adjustment device is the angle adjustment device according to claim 9.

11. The angle adjustment device according to claim 9, wherein, a flange is provided on a middle part of the sliding groove plate, and the expansion and contraction block is configured to move along an outer peripheral surface of the flange; and the flange is integrally formed with the sliding groove plate, or the flange is fixedly connected with the sliding groove plate.

12. The angle adjustment device according to claim 9, wherein, a plurality of mounting holes is provided on the unlocking cam, an upside down edge is provided on a side wall of each of the plurality of mounting holes, and the upside down edge is the first protrusion.

13. The angle adjustment device according to claim 12, wherein, a flange is provided on a middle part of the sliding groove plate, and the expansion and contraction block is configured to move along an outer peripheral surface of the flange; and the flange is integrally formed with the sliding groove plate, or the flange is fixedly connected with the sliding groove plate.

14. The angle adjustment device according to claim 12, wherein, the expansion and contraction block has a second protrusion, the unlocking cam is provided with a groove, and two ends of the second elastic piece in the deformation direction respectively abut against the second protrusion and a side wall of the groove.

15. The angle adjustment device according to claim 14, wherein, a flange is provided on a middle part of the sliding groove plate, and the expansion and contraction block is configured to move along an outer peripheral surface of the flange; and the flange is integrally formed with the sliding groove plate, or the flange is fixedly connected with the sliding groove plate.

* * * * *